US011542851B2

(12) United States Patent
Boriga et al.

(10) Patent No.: US 11,542,851 B2
(45) Date of Patent: Jan. 3, 2023

(54) EXHAUST SYSTEM

(71) Applicant: Purem GmbH, Neunkirchen (DE)

(72) Inventors: Remus Boriga, Wernau (DE); Florin Roman, Reichenbach (DE); Erik Pietruschka, Tübingen (DE); Sebastian Kneer, Esslingen (DE)

(73) Assignee: PUREM GMBH, Neunkirchen (DE)

( * ) Notice: Subject to any disclaimer, the term of this patent is extended or adjusted under 35 U.S.C. 154(b) by 209 days.

(21) Appl. No.: 16/582,799

(22) Filed: Sep. 25, 2019

(65) Prior Publication Data

US 2020/0102878 A1 Apr. 2, 2020

(30) Foreign Application Priority Data

Sep. 28, 2018 (DE) ...................... 10 2018 124 062.7

(51) Int. Cl.
*F01N 13/18* (2010.01)
*F01N 13/00* (2010.01)

(52) U.S. Cl.
CPC ....... *F01N 13/1855* (2013.01); *F01N 13/008* (2013.01); *F01N 2560/08* (2013.01); *F01N 2900/1406* (2013.01)

(58) Field of Classification Search
CPC ............... F01N 13/008; F01N 13/1855; F01N 2260/18; F01N 13/1805; F01N 2560/08; F01N 2900/1406
See application file for complete search history.

(56) References Cited

U.S. PATENT DOCUMENTS

| 2001/0051072 A1* | 12/2001 | Eckart ................... F16L 3/1083 403/344 |
| 2006/0208141 A1* | 9/2006 | Heiselbetz .............. F01N 13/14 248/200 |
| 2018/0258827 A1* | 9/2018 | Kuramashi ............. F01N 13/14 |
| 2021/0293173 A1* | 9/2021 | Hugh ....................... F01N 1/00 |

FOREIGN PATENT DOCUMENTS

| AT | 504095 A2 | 3/2008 |
| CN | 206737989 U | 12/2017 |
| CN | 207960722 U | 10/2018 |
| DE | 6930049 U | 11/1969 |
| DE | 102015226573 A1 | 6/2016 |
| WO | 2012096513 A2 | 7/2012 |

OTHER PUBLICATIONS

Webpage: https://www.dmpfasteners.com/kugel-components-c-1824_1157_1165/ (Year: 2018).*

* cited by examiner

*Primary Examiner* — Anthony Ayala Delgado
(74) *Attorney, Agent, or Firm* — McGlew and Tuttle, P.C.

(57) ABSTRACT

An exhaust system for an internal combustion engine of a vehicle includes an exhaust gas pipe, at least one branch pipe branching off from the exhaust gas pipe, for example, a pressure pipe (22), as well as at least one support device (38) supporting at least one branch pipe in relation to an exhaust system component. The support device (38) includes a carrier element (42) fixed to the exhaust system component, a clamping element (44) pressing at least one pressure pipe (22) against the carrier element (42), as well as a clamping (tensioning) device (58) acting between the carrier element (42) and the clamping element (44) for tensioning the clamping element (44) in relation to the carrier element (42).

14 Claims, 5 Drawing Sheets

EXHAUST SYSTEM

CROSS REFERENCE TO RELATED APPLICATIONS

This application claims the benefit of priority under 35 U.S.C. § 119 of Application 10 2018 124 062.7, filed Sep. 28, 2018, the entire contents of which are incorporated herein by reference.

TECHNICAL FIELD

The present invention pertains to an exhaust system for an internal combustion engine of a vehicle, comprising an exhaust gas pipe as well as at least one branch pipe branching off from the exhaust gas pipe, for example, a pressure pipe for the detection of the exhaust gas pressure prevailing in the exhaust system.

TECHNICAL BACKGROUND

In case of an exhaust system having such a configuration, the pressure in the exhaust system can be inferred by means of a pressure sensor connected to a pressure pipe provided by a branch pipe. If such a pressure pipe is provided with a pressure sensor each, for example, upstream and downstream of a particle filter in the exhaust system, then the pressure drop in the particle filter and thus the coating thereof with soot particles filtered out of the exhaust gas stream can be inferred on the basis of the pressure in the exhaust system that was detected by these two pressure sensors.

SUMMARY

An object of the present invention is to provide an exhaust system for an internal combustion engine of a vehicle as well as a support device, in which holding of the branch pipe of the exhaust system, which holding is protected against vibrations, is achieved.

This object is accomplished according to the present invention by an exhaust system for an internal combustion engine of a vehicle, comprising an exhaust gas pipe, at least one branch pipe branching off from the exhaust gas pipe, for example, a pressure pipe, as well as at least one support device supporting at least one branch pipe in relation to an exhaust system component, wherein the support device comprises a carrier element fixed to the exhaust system component, a clamping element pressing at least one branch pipe against the carrier element, as well as a clamping (tensioning) device acting relative to/between/on the carrier element and the clamping element for clamping the clamping element in relation to the carrier element.

By supporting a branch pipe, for example, a pressure pipe in relation to another component of the exhaust system, it is guaranteed by providing a support interaction in the exhaust system itself that an excessively long unsupported length of the branch pipe is not present.

In order to be able to achieve a reliable clamping action, it is proposed that the carrier element be fixed in one of its end areas to the exhaust system component and have at least one abutment area for a branch pipe in one of its end areas. Provisions may further be made for this that the clamping element have a passage opening for the clamping device in an intermediate area positioned between the two end areas of the same clamping element and a clamping area pressing a branch pipe against the carrier element in at least one of clamping element end areas.

In order to be able to reliably prevent the detachment of a branch pipe from the support device, at least one clamping area may have a clamping contour adapted to an outer circumferential contour of the branch pipe, for example, a pressure pipe clamped by this clamping area.

If only one branch pipe shall be supported with a support device in relation to the exhaust system, the clamping element may have a clamping area in one of its end areas and a clamping element support area being supported at the carrier element in its other end area.

In adaptation to this structure of the clamping element, the carrier element may have an abutment area in one of its end areas, a passage opening for the clamping device in an intermediate area positioned between its end areas and a carrier element support area supporting the clamping element support area in its other end area.

If a branch pipe, for example, pressure pipe, runs in its length area to be supported in relation to the exhaust system relatively close to the component of the exhaust system providing the support, it is proposed that the carrier element be fixed to the exhaust system component with its end area having the abutment area.

If the branch pipe, for example, pressure pipe to be supported runs at a greater distance from the component of the exhaust system providing the support, the carrier element may be fixed to the exhaust system component with its end area having the carrier element support area.

In an alternative configuration, the clamping element may have a clamping area in each of its two end areas for supporting two branch pipes by means of a single support device.

In association therewith, the carrier element may have two abutment areas in one of its end areas, wherein a passage opening for the clamping device is provided in the carrier element between the two abutment areas.

The carrier element may be fixed in its other end area to the exhaust system component in case of this configuration.

In order to be able to generate a reliable clamping action that can be set precisely with regard to the clamping force to be generated, it is proposed that the clamping device comprise a clamping (tensioning) screw and preferably a self-locking clamping (tensioning) nut screwed onto the tensioning screw.

In a stable configuration that can be achieved in a simple and cost-effective manner, the carrier element or/and the clamping element may preferably be made of bent sheet metal material.

The exhaust system component may be provided by an exhaust gas pipe or an exhaust gas treatment unit. Further, at least one branch pipe may be a pressure pipe.

Further, the exhaust system may be configured such that an exhaust gas treatment unit, preferably a particle filter, as well as an upstream exhaust gas pipe carrying exhaust gas towards the exhaust gas treatment unit and a downstream exhaust gas pipe carrying exhaust gas away from the exhaust gas treatment unit are provided, wherein a branch pipe, for example, pressure pipe supported by means of at least one support device branches off from the upstream exhaust gas pipe or/and a branch pipe, for example, pressure pipe supported by means of at least one support device branches off from the downstream exhaust gas pipe.

According to another aspect of the present invention, the object mentioned in the introduction is accomplished by a support device for supporting a branch pipe, for example, a pressure pipe in relation to an exhaust system component, preferably for an exhaust system configured according to the present invention, comprising a carrier element to be fixed to the exhaust system component, a clamping element for pressing at least one branch pipe against the carrier element as well as a clamping device acting relative to/between/on the carrier element and the clamping element for clamping the clamping element in relation to the carrier element.

It should be noted that such a support device may be configured with all the features and groups of features defining the configuration thereof and described above alone or in any combination.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
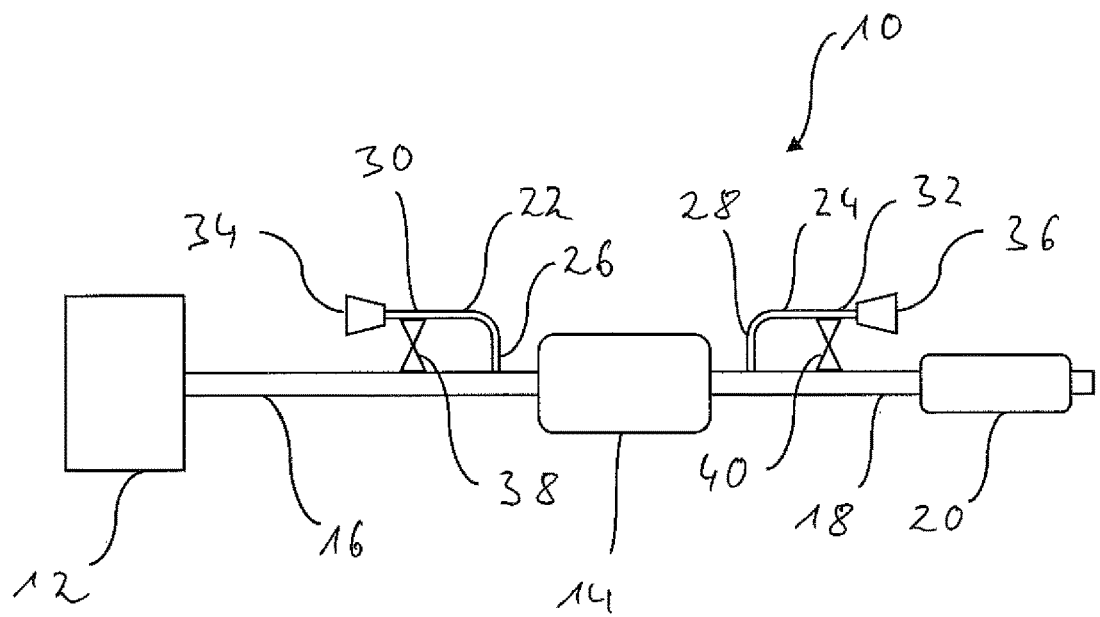
FIG. 1 is a schematic diagram showing a configuration of an exhaust system.

Referring to the drawings, FIG. 1 shows a schematic diagram of an exhaust system 10, that provides an exhaust line with which the exhaust gas, which is discharged from an internal combustion engine 12 in a vehicle, is treated and then discharged to the environment. As a central component, the exhaust line of the exhaust system 10 comprises a particle filter 14 as an exhaust gas treatment unit or as part of an exhaust gas treatment unit. The exhaust line also includes an upstream exhaust gas pipe 16, comprised of one or more exhaust pipe components (exhaust system components), that leads from the internal combustion engine 12 to the particle filter 14. The exhaust line also includes a downstream exhaust gas pipe 18, comprised of one or more exhaust pipe components (exhaust system components), that leads from the particle filter 14, for example, to a muffler 20, via which the exhaust gas is discharged to the environment. It should be noted that additional exhaust gas treatment units, e.g., an oxidation catalytic converter or an SCR catalytic converter or an additional muffler, may, of course, be integrated into the upstream exhaust gas pipe 16 or/and into the downstream exhaust gas pipe 18.

In order to detect the pressure drop in the particle filter 14 and thus to be able to infer the coating thereof with soot particles, pressure pipes 22, 24 branch off from the upstream exhaust gas pipe 16 and from the downstream exhaust gas pipe 18, respectively. In the sense of the present invention, the pressure pipes 22, 24 provide branch pipes, i.e., pipes, which branch off from other system areas, for example, from the exhaust gas pipes 16, 18 of the exhaust system 10.

The pressure pipes 22, 24 are, just as the exhaust gas pipes 16, 18, made of relatively rigid metallic material and have, for example, a length section 26 and 28 extending away from the respective exhaust gas pipe 16 and 18 approximately at right angles to the longitudinal extension thereof as well as a length section 30, 32 extending, for example, approximately parallel to the respective gas pipe 16, 18. A pressure sensor 34, 36 each may be connected to the length section 30 and 32 directly or via a flexible hose line, so that the exhaust gas pressure, especially the static exhaust gas pressure prevailing in the respective pressure pipe 22 and 24 and thus also in the associated exhaust gas pipe 16, 18 can be detected.

In order to prevent the pressure pipes 22, 24 from vibrating during the operation of a vehicle and thus to avoid an excessive stress on the pressure pipes 22, 24, especially in the area of their connection to the exhaust gas pipes 16 and 18, a support device 38, 40 is provided in association with each of the pressure pipes 22, 24. The configuration of the support device 38, 40 is described in detail below, for example, on the basis of the support device 38 with reference to FIGS. 2 through 4. It should be noted that the support device 40 may have a corresponding configuration.

The support device 38 shown in FIGS. 2-4 comprises a carrier element 42 fixed to the exhaust gas pipe 16 as well as a clamping element 44 interacting with this carrier element 42 in the manner described below. The carrier element 42 and the clamping element 44 are preferably made of bent sheet metal material. The carrier element 42 provides an abutment area 48 in one end area 46 for the pressure pipe 22 to be supported by the support device 38. The carrier element 42 provides a carrier element support area 52 in its other end area 50. The carrier element 42 has a passage opening 56 in an intermediate area 54 positioned between the two end areas 46, 50 for a clamping (tensioning) device generally designated by 58.

The clamping element 44 provides in one end area 60 a clamping area 62 which presses the pressure pipe 22 in a pressure pipe length section 30 against the abutment area 48 of the carrier element 42 and which is adapted to the outer circumferential contour of the pressure pipe 22, which outer circumferential contour is provided with an essentially circular geometry, and provides a correspondingly curved clamping contour, so that clamping area 62 encloses the pressure pipe 22 approximately over one fourth of the outer circumference thereof and is flatly in contact (with surface contact/extensive surface contact) with the pressure pipe 22.

In a clamping element other end area 64 (FIG. 4), the clamping element 44 provides a clamping element support area 66, with which the clamping element 44 is supported at the carrier element support area 52 of the carrier element 42. A passage opening 70 is provided in the clamping element 44 in an intermediate area 68 positioned between the two end areas 60, 64 for the clamping device 58.

The clamping device 58 comprises in the example shown a screw 72 which passes through the two passage openings

56, 70 with its shaft 74, which is provided with an external thread in at least some areas. In this connection, the device may be such that the head 76 of the screw 72 is supported at the intermediate area 54 of the carrier element 42 and a nut 78 screwed onto the shaft 74 acts on the clamping element 44 in its intermediate area 68. In order to prevent a detachment of the nut 78, the nut 78 preferably has a self-locking configuration.

When the pressure pipe 22 to be firmly supported by the support device 38 is positioned between the abutment area 48 and the clamping area 62 and when the clamping element support area 66 is supported at the carrier element support area 52, the two intermediate areas 54, 68 are positioned at spaced locations from one another, so that a clamping action pressing the pressure pipe 22 against the abutment area 48 is achieved by tightening the nut 78. Since the clamping area 62 encloses the pressure pipe 22 in some areas adapted to the outer circumferential contour of the pressure pipe 22, a lateral yielding motion of the pressure pipe 22 to be supported is prevented. The pressure pipe 22 is positioned in a defined manner with support at the abutment area 48 in an apex area 80 of the clamping area 62, which apex area 80 provides the greatest distance to the abutment area 48, since the clamping area 62 has a distance decreasing in relation to the abutment area 48 on both sides of the apex area 80.

Figure 2:
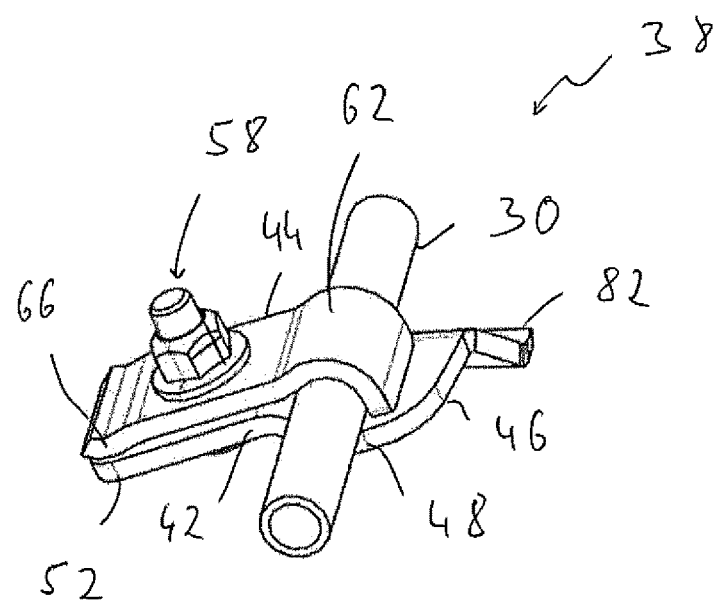
FIG. 2 is a perspective view of a support device for supporting a branch pipe.
Figure 3:
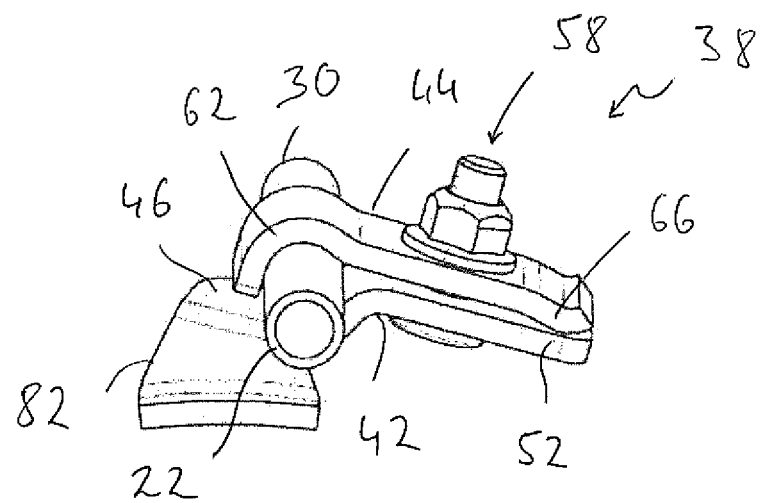
FIG. 3 is another perspective view of the support device from FIG. 2.
Figure 4:
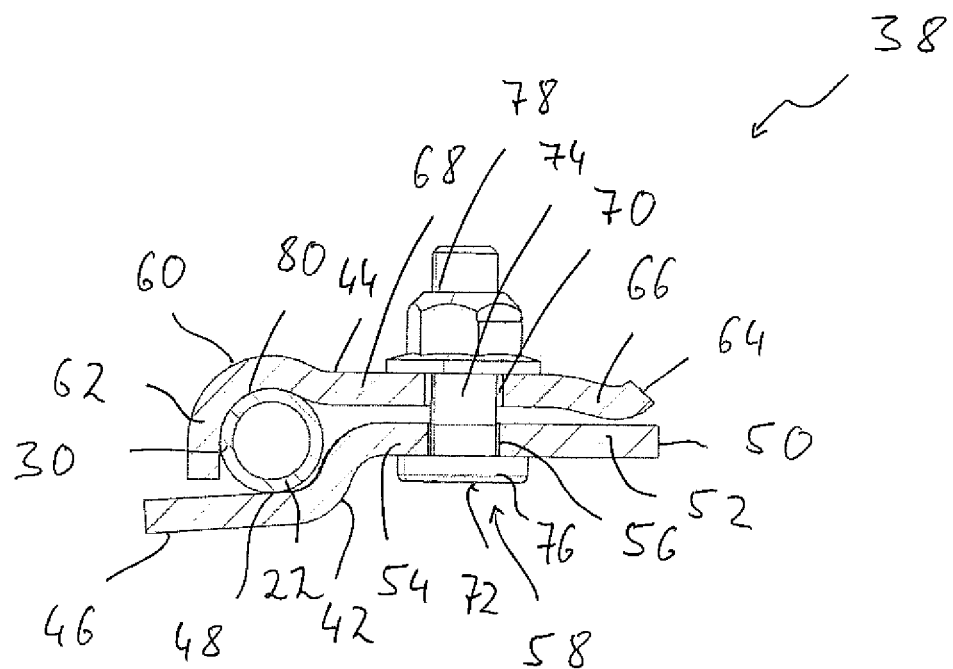
FIG. 4 is a sectional view of the support device from FIG. 2.

FIGS. 2 and 3 show a configuration of the support device 38, in which the carrier element 42 is fixed to the exhaust gas pipe 16 in its end area 46, which also provides the abutment area 48. For this purpose, a connection section 82 to be fixed to the exhaust gas pipe (the exhaust system component) 16, for example, by welding, is configured at the end area 46. Such a configuration is provided especially if the length section 30 of the pressure pipe 22 extends at a relatively short distance to the exhaust gas pipe 16.

A type of configuration, not shown, is especially suitable if the length section of the pressure pipe to be supported extends at a greater distance from the exhaust gas pipe or from another component of the exhaust system used for support. In this configuration, the carrier element with a carrier element end area also having the carrier element support area is fixed, for example, by welding to the component of the exhaust system provided for support with a connection section provided there.

Figure 5:
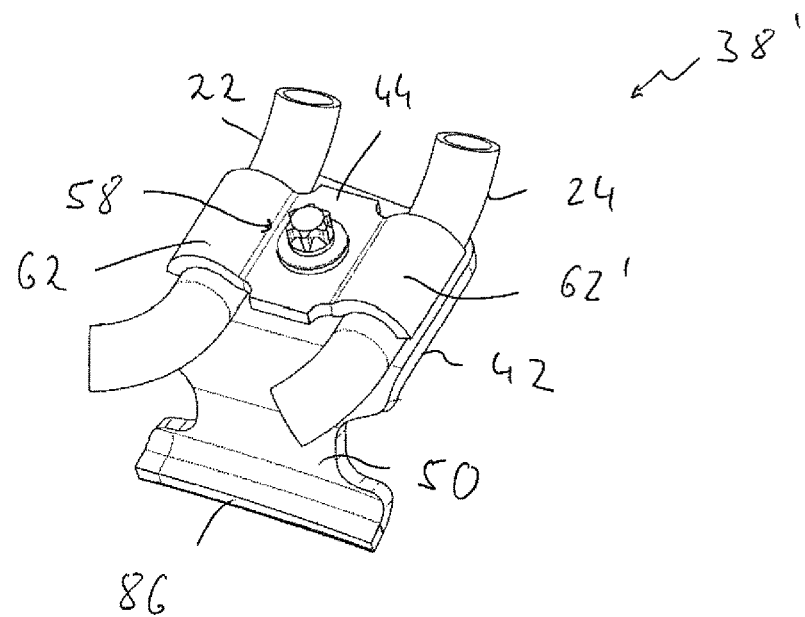
FIG. 5 is a perspective view of a support device for supporting two branch pipes.
Figure 6:
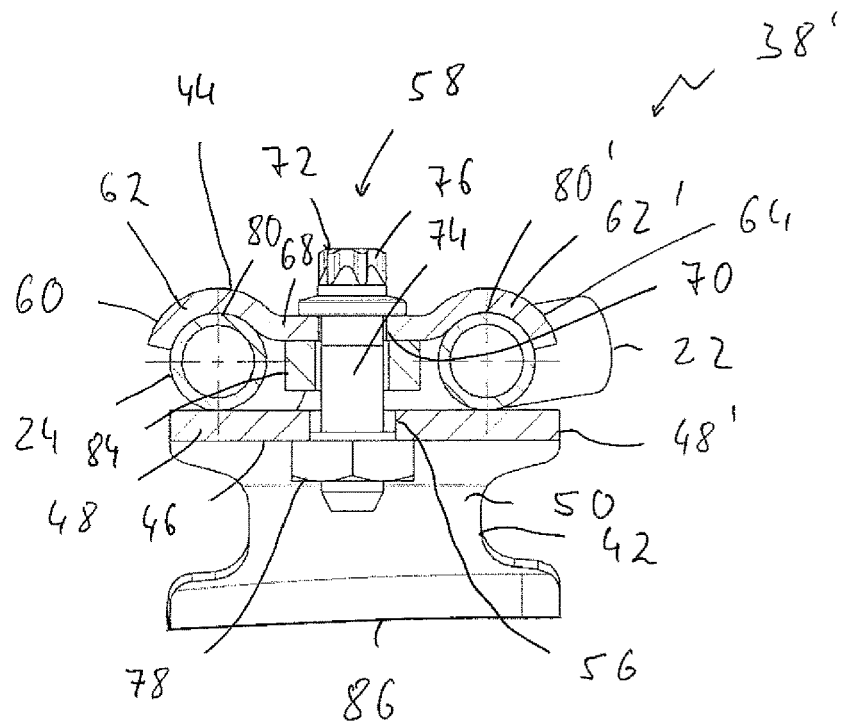
FIG. 6 is a sectional view of the support device from FIG. 5.

FIGS. 5 and 6 show a configuration of a support device 38', which is suitable for supporting two pressure pipes 22, 24. Such an arrangement may be selected if, unlike as shown in FIG. 1, the two support pipes 22, 24 do not extend in opposite directions in relation to one another or at spaced locations from one another, but rather, for example, the length sections 30, 32 thereof run next to one another in at least some areas.

In the configuration of the support device 38' shown in FIGS. 5 and 6, two abutment areas 48, 48' at laterally spaced locations from one another are provided in the end area 46 of the carrier element 42. The passage opening 56 for the clamping device 58, i.e., the screw 72 of same, is provided between the two abutment areas 48, 48'. The clamping element 44 has a clamping area 62, 62' each in its two end areas 60, 64. These clamping areas are adapted in their clamping contour again to the outer circumferential contour of the pressure pipes 22 and 24 to be clamped and have a maximum distance to the associated abutment area 48, 48' in a respective apex area 80, 80', so that a lateral yielding motion of a respective clamped pressure pipe 22, 24 is not possible.

The passage opening 70 for the screw 72 of the clamping device 58 is provided between the two end areas 62, 64 in the intermediate area 68 of the clamping element 44. The clamping element 44 is pulled against the pressure pipes 22, 24 by tightening the nut 78 and thus clamps these pressure pipes 22, 24 firmly in relation to the carrier element 42. A spacer 84, which ensures a space between the clamping element 44 and the carrier element 42 that is suitable for accommodating such pipes to be held even in case of pipes not positioned between the clamping element 44 and the carrier element 42, is provided in the intermediate area 68, for example, fixed at the clamping element 44.

The carrier element 42 is fixed, for example, by welding to one of the exhaust gas pipes 16 and 18 in its other end area 50 with a connection section 86 provided there.

Figure 7:
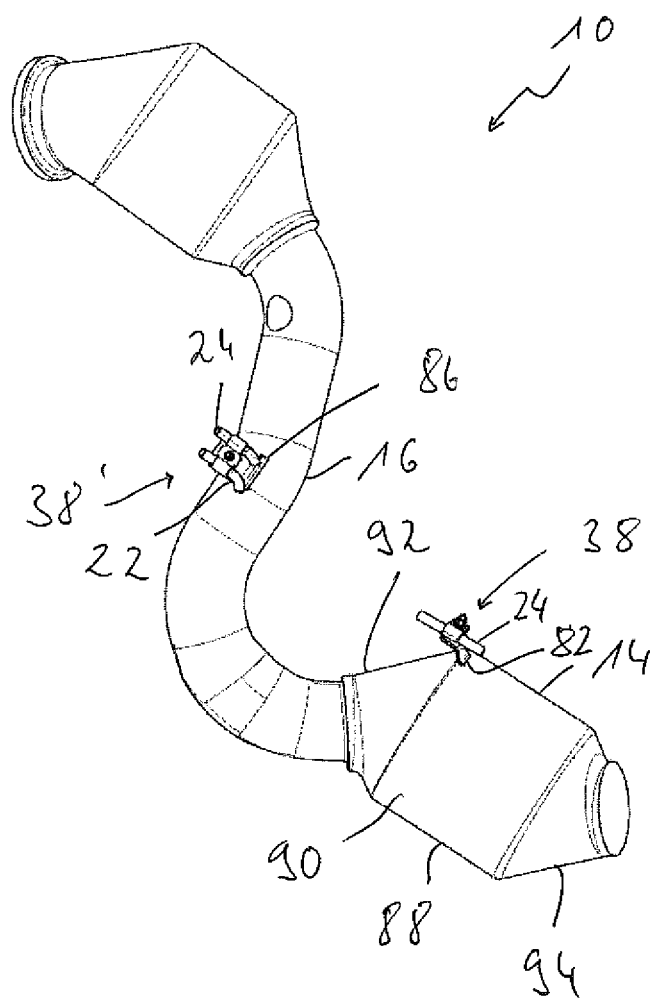
FIG. 7 is a perspective view showing a part of an exhaust system with the support devices from FIGS. 2 and 5 provided on it.
Figure 8:
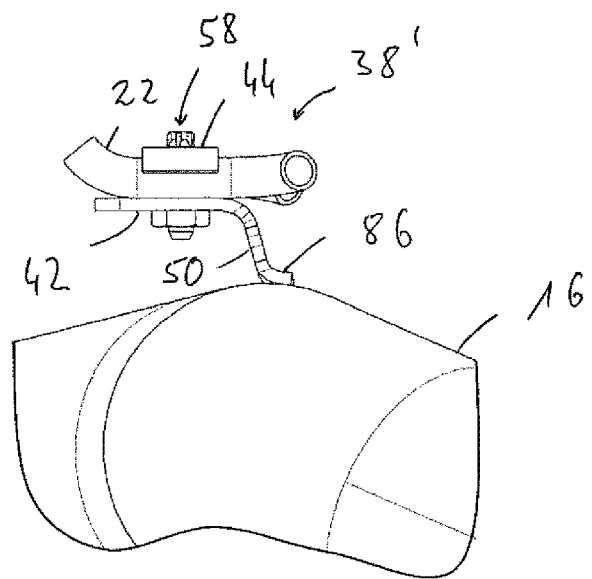
FIG. 8 is an enlarged detail perspective view of the connection of the support device from FIG. 2 to an exhaust system component.
Figure 9:
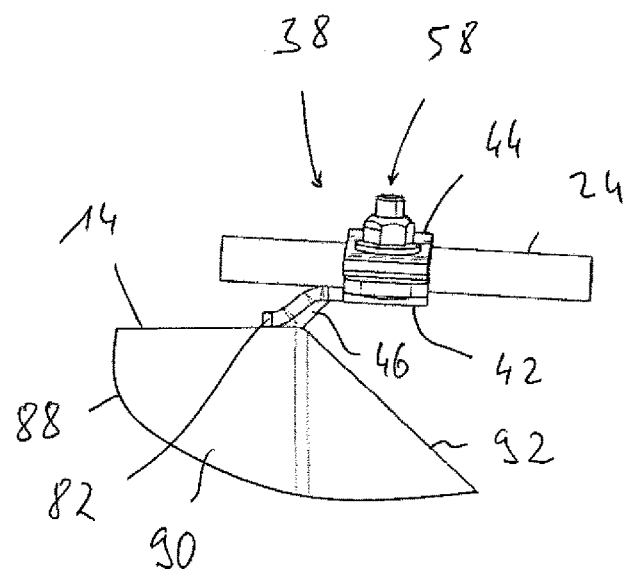
FIG. 9 is an enlarged detail of the connection of the support device from FIG. 5 to an exhaust system component.

FIGS. 7-9 show the connection, to exhaust system, exhaust line components, of the support devices 38, 38' that are described above and are shown in FIGS. 2-6. Thus, for example, the support device 38' is connected, namely the support device connection section 86, to the exhaust system component that is a part of the exhaust gas pipe 16 running upstream of the particle filter 14. The support device 38' supports the two branch pipes (pressure pipes/exhaust gas pipes) 22, 24 in relation to the exhaust gas pipe 16, namely in relation to the exhaust system component. The support device 38 is fixed with support device connection section 82 to a housing 88, for example, to an essentially cylindrical jacket 90 of the particle filter 14, in order to support the branch pipe 24 in relation to the particle filter 14, namely in relation to the exhaust system component, which branch pipe 24 extends off or branches off from the exhaust gas pipe 18, which is not shown in FIG. 7, and is connected to the particle filter 14 downstream and extends further to the support device 38'. It should be pointed out that, for example, the support device 38 could also be connected to one of the two end pieces 92, 94 of the housing 88, which end pieces 92, 94 have, for example, a funnel shape.

A support action that is simple to generate and yet acts in a stable manner is provided for a pressure pipe branching off from an exhaust gas pipe or from another area of an exhaust system with the above-described configuration of an exhaust system and of a support device for supporting a pressure pipe in relation to another component of the exhaust system. A plurality of such support devices may, of course, also be used for supporting a single pressure pipe depending on the length of such a pressure pipe. Pressure pipes of different diameters and also of different cross-sectional geometries may be supported by the support device configured according to the present invention. Such a support device may also interact with the pressure pipe in a length sections of a respective pressure pipe, which does not extend parallel, for example, to an exhaust gas pipe, from which the pressure pipe branches off. For this purpose, the carrier element may especially be shaped such that it has a suitable spatial position for supporting the pressure pipe in case of connection, for example, to an exhaust gas pipe in its end area providing an abutment area.

Even though an exhaust system is shown in the figures, in which the pressure pipes branch off from exhaust gas pipes extending upstream and downstream of a particle filter, it is apparent that one of the pressure pipes or both of the pressure pipes may also branch directly off from a housing of a particle filter, for example, the end pieces shown in FIG. 7, in order to detect the pressure closer to the system area of the particle filter to be analyzed in regard to its coating with soot particles in this manner. Further, it should, in principle, be pointed out that other pipes in other systems may also be supported by means of such a support device in relation to a structure supporting these pipes.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a vehicle, the exhaust system comprising:
   at least one exhaust system component;
   at least one branch pipe; and
   at least one support device for supporting one single branch pipe of the at least one branch pipe in relation to the at least one exhaust system component, wherein the at least one support device comprises a carrier element fixed to the at least one exhaust system component, a clamping element pressing the one single branch pipe against the carrier element, and a clamping device acting on the carrier element and the clamping element for clamping the clamping element in relation to the carrier element, wherein:
   the clamping element has two clamping element end areas;
   the clamping element has a passage opening, for the clamping device, in a clamping element intermediate area positioned between the two clamping element end areas;
   the clamping element has a clamping area pressing the one single branch pipe against the carrier element in one of the two clamping element end areas and has a clamping element support area directly supported at the carrier element in the other one of the two clamping element end areas;
   the carrier element has two carrier element end areas;
   the carrier element has a passage opening for the clamping device in a carrier element intermediate area positioned between the two carrier element end areas;
   the carrier element is fixed in one of the two carrier element end areas to the exhaust system component;
   the carrier element has an abutment area in only one of the two carrier element end areas for abutting the one single branch pipe;
   the carrier element has a carrier element support area directly supporting the clamping element support area in the other one of the two carrier element end areas such that, with the one single branch pipe being clamped between the clamping area and the carrier element abutment area, the carrier element intermediate area and the clamping element intermediate area are positioned at spaced locations from one another;
   the carrier element is fixed to the exhaust system component with at the end area having the abutment area.

2. The exhaust system in accordance with claim 1, wherein the clamping area has a clamping contour adapted to an outer circumferential contour of the one single branch pipe.

3. The exhaust system in accordance with claim 1, wherein the clamping device comprises a clamping screw and a clamping nut screwed onto the clamping screw.

4. The exhaust system in accordance with claim 1, wherein:
   the carrier element is made of bent sheet metal material; or
   the clamping element is made of bent sheet metal material; or
   the carrier element and the clamping element are made of bent sheet metal material.

5. The exhaust system in accordance with claim 1, wherein the exhaust system component is comprised by:
   an exhaust gas pipe; or
   an exhaust gas treatment unit.

6. The exhaust system in accordance with claim 1, wherein the one single branch pipe is a pressure pipe.

7. The exhaust system in accordance with claim 1, wherein:
   the at least one exhaust system component comprises an exhaust gas treatment unit, an upstream exhaust gas pipe, carrying exhaust gas towards the exhaust gas treatment unit and a downstream exhaust gas pipe, carrying exhaust gas away from the exhaust gas treatment unit and the carrier element is fixed to one of the exhaust gas treatment unit, the upstream exhaust gas pipe, and the downstream exhaust gas pipe; and
   the one single branch pipe, supported by means of the at least one support device, branches off from the upstream exhaust gas pipe or the one single branch pipe supported by means of at least one support device, branches off from the downstream exhaust gas pipe.

8. The exhaust system in accordance with claim 1, wherein:
   the at least one branch pipe comprises another branch pipe;
   the at least one exhaust system component comprises an exhaust gas treatment unit, an upstream exhaust gas pipe, carrying exhaust gas towards the exhaust gas treatment unit and a downstream exhaust gas pipe, carrying exhaust gas away from the exhaust gas treatment unit and the carrier element is fixed to one of the exhaust gas treatment unit, the upstream exhaust gas pipe, and the downstream exhaust gas pipe;
   the one single branch pipe, supported by means of the at least one support device, branches off from the upstream exhaust gas pipe; and
   the another branch pipe, supported by means of another support device of the at least one support device, branches off from the downstream exhaust gas pipe.

9. An exhaust system for an internal combustion engine of a vehicle, the exhaust system comprising:
   an exhaust system component;
   a branch pipe; and
   a support device configured to support only one single branch pipe of the branch pipe relative to the exhaust system component, the support device comprising a carrier element, a clamping element and a clamping device, the carrier element being fixed to the exhaust system component, the clamping element pressing the one single branch pipe against the carrier element, the clamping device acting on the carrier element and the clamping element for clamping the clamping element in relation to the carrier element, the clamping element having a clamping area, a clamping element support area, a first clamping element end area, a second clamping element end area and a clamping element intermediate area arranged between the first clamping element end area and the second clamping element end area, the clamping element intermediate area comprising a clamping element passage opening, the clamping area pressing the one single branch pressure pipe against the carrier element in one of the first clamping element end area and the second clamping element end area, the clamping element support area being directly supported at the carrier element in another one of the first clamping element end area and the second clamping element end area, the carrier element having a carrier element support area, an abutment area, a first carrier element end area, a second carrier element end area and a carrier element intermediate area having a carrier element passage opening for the clamping device, the carrier element intermediate area being located between the first carrier element end area and the second carrier element end area, wherein one of the first carrier element end area and the second carrier element end area is fixed to the exhaust system component, the abutment area being located in only one of the first carrier element end area and the second carrier element end area for abutting the one single branch pipe, the carrier element support area directly supporting the clamping element support area in another one of the first carrier element end area and the second carrier element end area such that, with the one single branch pipe being clamped between the clamping area and the carrier element abutment area, the carrier element intermediate area is located at a spaced location from the clamping element intermediate area.

10. The exhaust system in accordance with claim 9, wherein the carrier element support area and the clamping element support area being located on one side of the clamping element passage opening, the single branch pipe being located on another side of the clamping element passage opening.

11. The exhaust system in accordance with claim 10, wherein no branch pipe is provided on the one side of the clamping element passage opening.

12. An exhaust system for an internal combustion engine of a vehicle, the exhaust system comprising:
   an exhaust system component;
   a branch pipe; and
   a support device supporting the branch pipe relative to the exhaust system component, the support device comprising a carrier element, a clamping element and a clamping device, the carrier element being fixed to the exhaust system component, the clamping element pressing only one single branch pipe of the branch pipe against the carrier element, the clamping device acting on the carrier element and the clamping element for clamping the clamping element relative to the carrier element, the clamping element having a first clamping element end area, a second clamping element end area and a clamping element intermediate area arranged between the first clamping element end area and the second clamping element end area, the clamping element intermediate area comprising a clamping element passage opening, the first clamping element end area comprising a clamping area, the clamping area pressing the only one single branch pipe against the carrier element, the second clamping element end area comprising a clamping element support area supported at the carrier element, the carrier element having a first carrier element end area, a second carrier element end area and a carrier element intermediate area comprising a carrier element passage opening for the clamping device, the first carrier element end area being fixed to the exhaust system component, the first carrier element end area comprising a carrier element abutment area for abutting the only one single branch pipe, the second carrier element end area comprising a carrier element support area directly supporting the clamping element support area such that, with the only one single branch pipe being clamped between the clamping area and the carrier element abutment area, the carrier element intermediate area is located at a spaced location from the clamping element intermediate area.

13. The exhaust system in accordance with claim 12, wherein the carrier element support area and the clamping element support area are located on one side of the clamping element passage opening, the only one single branch pipe being located on another side of the clamping element passage opening.

14. The exhaust system in accordance with claim 13, wherein no branch pipe is provided on the one side of the clamping element passage opening.

* * * * *